US012644535B2

(12) United States Patent
Holmes et al.

(10) Patent No.: US 12,644,535 B2
(45) Date of Patent: *Jun. 2, 2026

(54) SYSTEM FOR ADJUSTING RATE OF SPOOL CENTERING IN A PILOT-CONTROLLED HYDRAULIC SPOOL VALVE

(71) Applicant: Barko Hydraulics, LLC, Superior, WI (US)

(72) Inventors: James Douglas Holmes, Wrenshall, MN (US); Eric Thomas Nelson, Proctor, MN (US); Nathan Bradley Wourms, Hermantown, MN (US)

(73) Assignee: Barko Hydraulics, LLC, Superior, WI (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/132,243

(22) Filed: Apr. 7, 2023

(65) Prior Publication Data

US 2023/0243439 A1 Aug. 3, 2023

Related U.S. Application Data

(62) Division of application No. 16/837,117, filed on Apr. 1, 2020, now Pat. No. 11,624,452.

(60) Provisional application No. 62/833,182, filed on Apr. 12, 2019.

(51) Int. Cl.
*F16K 31/383* (2006.01)

(52) U.S. Cl.
CPC .................................. *F16K 31/383* (2013.01)

(58) Field of Classification Search
CPC . F16K 31/383; F15B 13/0407; F15B 13/0433
See application file for complete search history.

(56) References Cited

U.S. PATENT DOCUMENTS

| | | | |
|---|---|---|---|
| 5,832,730 | A | 11/1998 | Mizui |
| 5,941,155 | A | 8/1999 | Aral et al. |
| 6,095,177 | A | 8/2000 | Machat et al. |
| 6,619,037 | B1 | 9/2003 | Toyooka et al. |
| 7,934,377 | B2 | 5/2011 | Kim et al. |
| 8,387,376 | B2 | 3/2013 | Son |
| 8,650,778 | B2 | 2/2014 | Okano et al. |
| 8,925,584 | B2 | 1/2015 | Balmonet et al. |
| 9,080,312 | B2 | 7/2015 | Takaura |
| 9,546,468 | B2 | 1/2017 | Bang |

(Continued)

*Primary Examiner* — Reinaldo Sanchez-Medina
(74) *Attorney, Agent, or Firm* — Shook, Hardy & Bacon L.L.P.

(57) ABSTRACT

The disclosure is directed to an apparatus and system for adjusting rate of spool centering in a pilot-controlled hydraulic spool valve. The apparatus includes a first pilot port and a second pilot port. The apparatus includes a first valve port and a second valve port. The apparatus also includes a first hydraulic circuit connecting the first pilot port and the first valve port, wherein the first hydraulic circuit, based on a hydraulic fluid pressure of the second pilot port, comprises one of a controlled-flow condition and an unrestricted-flow condition. The apparatus further includes a second hydraulic circuit connecting the second pilot port and the second valve port, wherein the second hydraulic circuit, based on a hydraulic fluid pressure of the first pilot port, comprises one of a controlled-flow condition and an unrestricted-flow condition.

20 Claims, 9 Drawing Sheets

(56)           References Cited

U.S. PATENT DOCUMENTS

| | | | |
|---|---|---|---|
| 9,725,884 B2 | 8/2017 | Hashimoto | |
| 9,797,117 B2 | 10/2017 | Kubo | |
| 10,077,851 B2 | 9/2018 | Simonsen | |
| 2012/0205565 A1* | 8/2012 | Balmonet | F15B 13/0433 251/25 |
| 2014/0137956 A1 | 5/2014 | Kim | |
| 2018/0105205 A1 | 4/2018 | Takenaka et al. | |

* cited by examiner

Flow control valve
410

Check valve
420

400

400

900

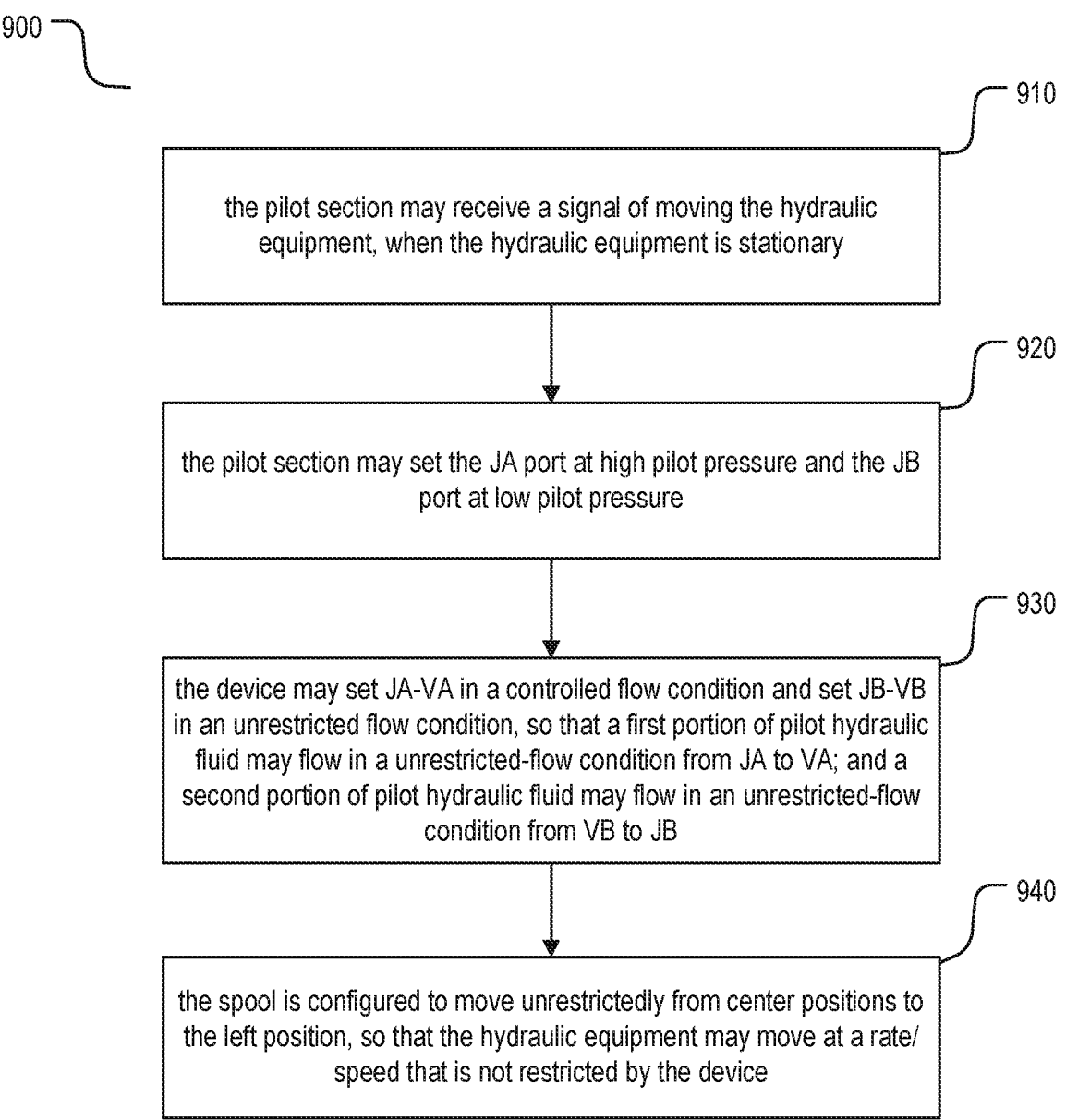

910 the pilot section may receive a signal of moving the hydraulic equipment, when the hydraulic equipment is stationary

920 the pilot section may set the JA port at high pilot pressure and the JB port at low pilot pressure

930 the device may set JA-VA in a controlled flow condition and set JB-VB in an unrestricted flow condition, so that a first portion of pilot hydraulic fluid may flow in a unrestricted-flow condition from JA to VA; and a second portion of pilot hydraulic fluid may flow in an unrestricted-flow condition from VB to JB

940 the spool is configured to move unrestrictedly from center positions to the left position, so that the hydraulic equipment may move at a rate/ speed that is not restricted by the device

FIG. 9

SYSTEM FOR ADJUSTING RATE OF SPOOL CENTERING IN A PILOT-CONTROLLED HYDRAULIC SPOOL VALVE

RELATED APPLICATION

This application is a divisional of U.S. Ser. No. 16/837, 117 (filed Apr. 1, 2020 and to be issued as U.S. Pat. No. 11,624,452), which claims the priority benefit of U.S. Provisional Patent Application No. 62/833,182 (filed on Apr. 12, 2019). Each of the aforementioned applications is hereby incorporated by reference in its entirety.

BACKGROUND

1. Technical Field

The present disclosure relates to controls for hydraulics.

2. Background Information

A hydraulic drive system can use pressurized hydraulic fluid to drive hydraulic machinery. A hydraulic drive system includes a generator such as a hydraulic pump, a control system such as a pilot-controlled hydraulic spool valve, and an actuating device such as a hydraulic cylinder to drive the machinery.

A conventional pilot-control hydraulic valve include a pilot section and a main hydraulic valve section. The pilot section, which may be controlled by a joystick, supplies pressurized hydraulic fluid to move a spool of the main hydraulic valve between center and left/right positions. Abrupt centering of the joystick results in the spool abruptly returning to center, closing the hydraulic valve abruptly, and a jumping effect of an equipment controlled by the main hydraulic valve. Consequently, this may cause operator discomfort.

The present disclosure is directed toward addressing one or more drawbacks, including but not limited to those set forth above.

BRIEF SUMMARY

The present disclosure is directed to an apparatus for adjusting rate of spool centering in a pilot-controlled hydraulic spool valve. The apparatus includes a first pilot port adapted to connect to a first pilot port of a pilot section, and a second pilot port adapted to connect to a second pilot port of the pilot section. The apparatus includes a first valve port adapted to connect to a first control port of a hydraulic spool valve, and a second valve port adapted to connect to a second control port of the hydraulic spool valve. The apparatus also includes a first hydraulic circuit connecting the first pilot port and the first valve port, wherein the first hydraulic circuit, based on a hydraulic fluid pressure of the second pilot port, comprises one of a controlled-flow condition and an unrestricted-flow condition. The apparatus further includes a second hydraulic circuit connecting the second pilot port and the second valve port, wherein the second hydraulic circuit, based on a hydraulic fluid pressure of the first pilot port, comprises one of a controlled-flow condition and an unrestricted-flow condition.

The present disclosure is also directed to a device for adjusting rate of spool centering in a pilot-controlled hydraulic spool valve. The device includes a manifold. The manifold includes a first pilot port adapted to connect to a first pilot port of a pilot section, and a second pilot port adapted to connect to a second pilot port of the pilot section. The manifold includes a first valve port adapted to connect to a first control port of a hydraulic spool valve, and a second valve port adapted to connect to a second control port of the hydraulic spool valve. The device includes a first hydraulic circuit disposed inside the manifold, the first hydraulic circuit connecting the first pilot port and the first valve port, wherein the first hydraulic circuit, based on a hydraulic fluid pressure of the second pilot port, comprises one of a controlled-flow condition and an unrestricted-flow condition. The device further includes a second hydraulic circuit disposed inside the manifold, a second hydraulic circuit connecting the second pilot port and the second valve port, wherein the second hydraulic circuit, based on a hydraulic fluid pressure of the first pilot port, comprises one of a controlled-flow condition and an unrestricted-flow condition.

The present disclosure is further directed to system for adjusting rate of spool centering in a pilot-controlled hydraulic spool valve. The system includes a pilot valve configured to receive control signal from an operator, a flow control device configured to receive hydraulic fluid from the pilot valve, and a main hydraulic valve configured to receive hydraulic fluid from the flow control device. The flow control device includes a first pilot port adapted to connect to a first pilot port of the pilot valve, and a second pilot port adapted to connect to the second pilot port of the pilot valve. The flow control device includes a first valve port adapted to connect to a first control port of the main hydraulic valve, and a second valve port adapted to connect to a second control port of the main hydraulic valve. The flow control device also includes a first hydraulic circuit connecting the first pilot port and the first valve port, wherein the first hydraulic circuit, based on a hydraulic fluid pressure of the second pilot port, comprises one of a controlled-flow condition and an unrestricted-flow condition. The flow control device further includes a second hydraulic circuit connecting the second pilot port and the second valve port, wherein the second hydraulic circuit, based on a hydraulic fluid pressure of the first pilot port, comprises one of a controlled-flow condition and an unrestricted-flow condition.

BRIEF DESCRIPTION OF THE DRAWINGS

FIG. 9 is a flow diagram of a process of using the apparatus or system in the present disclosure.

DETAILED DESCRIPTION OF THE DRAWINGS

Figure 1:
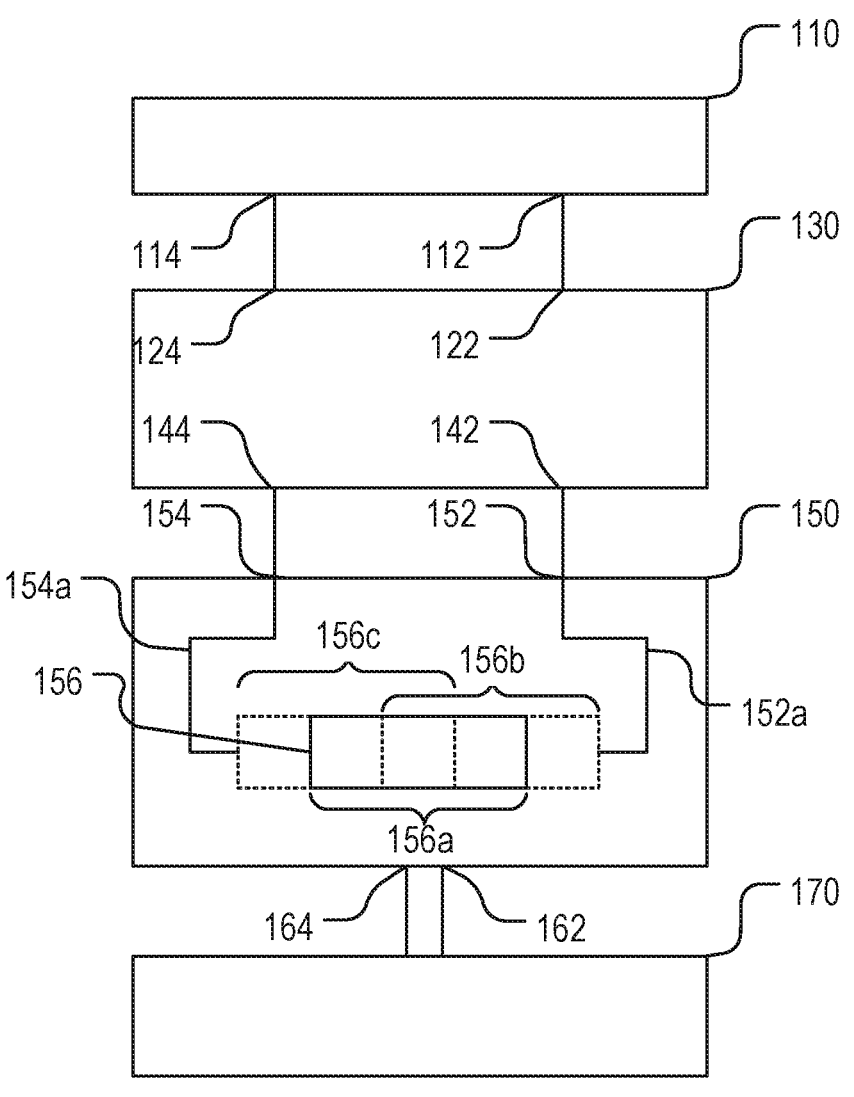
FIG. 1 is a schematic diagram of a system for adjusting rate of spool centering in a pilot-controlled hydraulic spool valve.

The present disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter includes combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

A hydraulic drive system may use pressurized hydraulic fluid to drive hydraulic machinery. A hydraulic drive system may include a generator such as a hydraulic pump, a control system such as a pilot-controlled hydraulic spool valve, and an actuating device such as a hydraulic cylinder to drive a machinery. The machinery may include an machinery interface receiving an attachment tool, for example, an arm, a drill, a shovel, a snow blower, a loader boom, or the like.

A conventional pilot-controlled hydraulic valve may include a pilot section and a main hydraulic valve section. The pilot section, which may be controlled by a joystick, may supply pressurized hydraulic fluid to move a spool of the main hydraulic valve between a center position and a left/right position. The conventional pilot-controlled hydraulic valve may contain a spring that returns the spool to the center position when a pilot control pressure is not present. This centered condition occurs abruptly if the pilot control pressure drops off rapidly. For example, abrupt centering of the joystick results in the spool abruptly returning to center, closing the hydraulic valve abruptly, and causing a jumping effect of an equipment controlled by the main hydraulic valve. Consequently, this may cause discomfort to the operator.

The present disclosure is directed to a device 130 for adjusting rate of spool centering in a pilot-controlled hydraulic spool valve, as shown in FIG. 1. The device 130 may include a hydraulic circuit, and may be disposed between a pilot section 110 and a main hydraulic valve section 150 of the pilot-controlled hydraulic spool valve.

The present disclosure may be also directed to a system including the device 130 and at least a portion of the pilot section 110 or at least a portion of the main hydraulic valve section 150.

As FIG. 1 shows, the pilot section 110 may include a first pilot fluid port 112 ("JA port" of the pilot section) and a second pilot fluid port 114 ("JB port" of the pilot section). The pilot section 110 may couple to a control device, for example, a joystick, and receive and respond to control signals from the control device. For example, when the pilot section 110 receives a signal of moving a hydraulic equipment to the left from the control device, the pilot section 110 may be configured to apply a high pilot pressure to the JA port and/or a low pilot pressure to the JB port. Vice versa, when the pilot section 110 receives a signal of moving the hydraulic equipment to the right direction from the control device, the pilot section 110 may be configured to apply a low pilot pressure to the JA port and/or a high pilot pressure to the JB port. When the pilot section 110 receives a signal of stopping the hydraulic equipment from the control device, the pilot section 110 may be configured to apply a low pilot pressure to both JA and JB ports.

As FIG. 1 shows, the device 130 may include a first pilot port 122 ("JA port" of the device) and a second pilot port 124 ("JB port" of the device). The JA and JB ports of the device 130 may be adapted to connect to the JA and JB ports of the pilot section 110, respectively. The device 130 may include a first valve port 142 ("VA port" of the device) and a second valve port 144 ("VB port" of the device). The VA and VB ports of the device 130 may be adapted to connect to VA and VB ports of the main hydraulic valve section 150, respectively. A pilot fluid pressure on VA or VB ports of the device 130 may depend on the pilot fluid pressure of JA or JB port, respectively.

As shows in FIG. 1, the main hydraulic valve section 150 may include a spool 156, a first valve port 152 ("VA port" of the main hydraulic valve section), a second valve port 154 ("VB port" of the main hydraulic valve section). The spool may include a number of positions, for example, three positions including a center position 156a, a right position 156b, and a left position 156c. The spool may move between the positions in response to a pilot fluid pressure of the VA 152 or VB port 154, which in turn depends on the pilot fluid pressure of JA 122 or JB port 124, respectively. In one implementation, when the VA port 152 has a high pilot pressure, the spool may move towards the left position 156c, for example, moving from the center position 156a to the left position 156c, or moving from the right position 156b to the center position 156a and then to the left position 156c. Vice versa, when the VB port 154 has a high pilot pressure, the spool may move towards the right position 156b, for example, moving from the center position 156a to the right position 156b, or moving from the left position 156c to the center position 156a and then to the right position 156b. When neither VA port nor VB port has the high pilot pressure, the spool may move to and/or stay at the center position 156a in response to force from a spring (not shown).

Further as shows in FIG. 1, the main hydraulic valve section 150 may have a first port 162 and a second port 164 connecting to a hydraulic equipment 170. For example, the hydraulic equipment may include a hydraulic cylinder. Depending on the spool position, the first port 162 or the second port 164 may supply pressurized hydraulic fluid to drive the hydraulic equipment 170.

As described in more details below, the device 130 may include a flow control mechanism and a bypass mechanism. The bypass mechanism may be configured to bypass the flow control mechanism in response to a pilot signal. The device may be configured to provide adjustability of the speed of the spool returning to center position without limitation of speed of spool moving to left/right position. Consequently, the device may dampen the spool return to center without reducing the main hydraulic valve's ability to abruptly moving the spool to either left or right positions from the center position.

Therefore, the present disclosure may provide adjustability of a speed/rate at which the spool returns to center, thereby dampening the valves response to abrupt reductions in pilot control pressure, without limiting a speed/rate at which the spool travels away from the center positions when the pilot control pressure is applied. For example, in one implementation, a joystick coupled with the pilot section may be snapped abruptly back to center, but the speed/rate at which the spool returns to center may be controlled and adjusted.

Therefore, the present disclosure may achieve a gentle stop of the machinery while minimizing the feel of a lag in response, and may reduce the drawbacks associated with conventional system, increasing comfort and productivity. The drawbacks may include but not limited to, the discomforting jumping effect related to the conventional pilot-controlled hydraulic spool valve. The present disclosure may also provide high adjustability, allowing fine turning to optimize functionality of the hydraulic system, and provide high versatility, capable of being integrated with a valve bank design up front or within an external manifold for retrofit on any existing hydraulic system.

Figure 2:
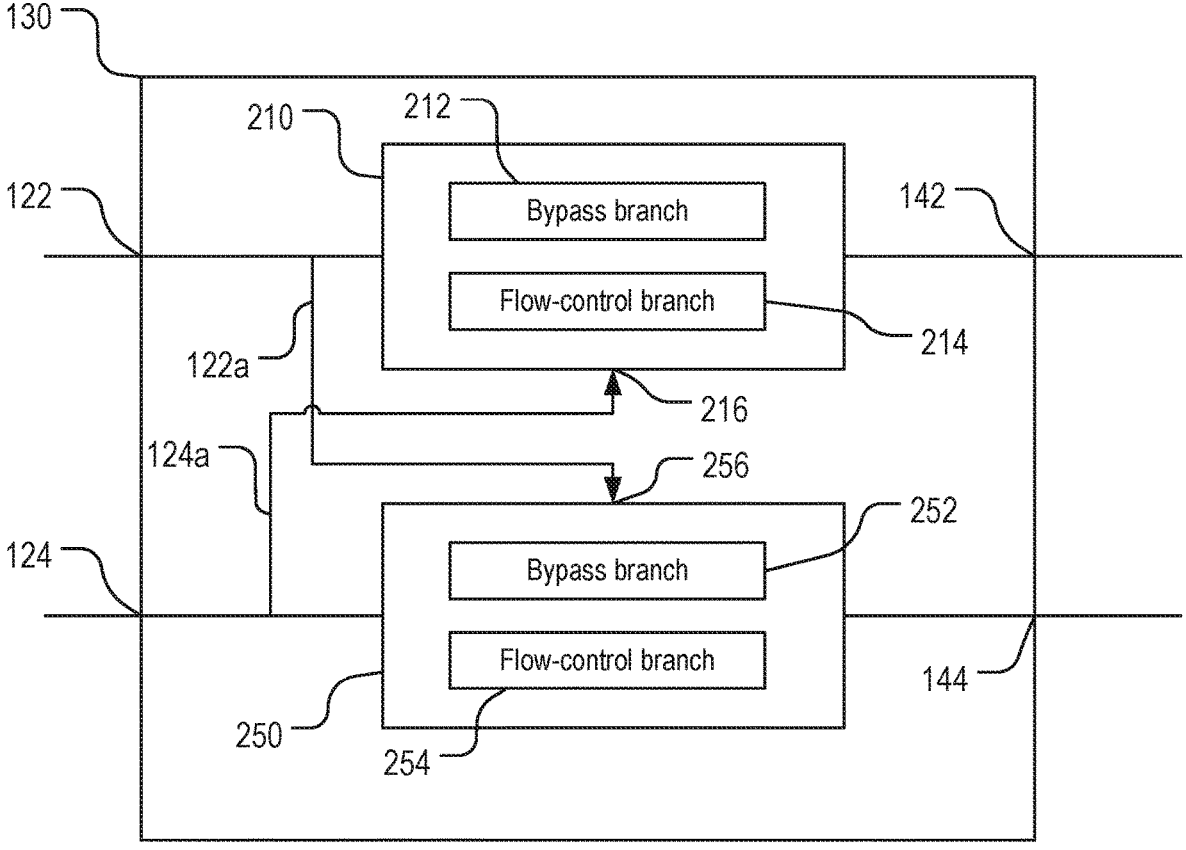
FIG. 2 is schematic diagram of an apparatus for adjusting rate of spool centering in a pilot-controlled hydraulic spool valve.

FIG. 2 shows an example of the diagram of the device 130 for adjusting rate of spool centering in a pilot-controlled hydraulic spool valve. The device 130 may include a first hydraulic circuit 210 connecting the JA port 122 of the device 130 to the VA port 142 of the device 130, and a second hydraulic circuit 250 connecting the JB port 124 of the device 130 to the VB port 144 of the device 130.

As shown in FIG. 2, the first hydraulic circuit 210 may include a bypass branch 212 and a flow-control branch 214. The flow-control branch 214 may provide a flow control mechanism, restricting the pilot hydraulic fluid flow between the JA port 122 and the VA port 142 in either direction or both directions. The flow control mechanism may include but not limited to: a complete block of flow in one flow direction or both direction, a restricted-flow with a flow rate limitation in one flow direction or both directions, and a complete block of flow in one flow direction and a restricted flow with a flow rate limitation in another direction. The bypass branch 212 may provide a mechanism of bypassing the flow-control branch. The bypass mechanism may include but not limited to: an unrestricted flow in both direction, and an unrestricted flow in one direction and a complete block of flow in another direction. In one implementation, the bypass branch 212 and the flow-control branch 214 may share at least a portion of their respective components. In another implementation, the bypass branch 212 and the flow-control branch 214 may be parallel hydraulic circuits and may not share any component.

Similarly as shown in FIG. 2, the second hydraulic circuit 250 may include a bypass branch 252 and a flow-control branch 254. The flow-control branch 254 may provide a flow control mechanism, restricting the pilot hydraulic fluid flow between the JB port 124 and the VB port 144 in either direction or both directions. The flow control mechanism may include but not limited to: a complete block of flow in one flow direction or both directions, a flow rate limitation in one flow direction or both direction, and a complete block of flow in one direction and a flow rate limitation in another direction. The bypass branch 252 may provide a mechanism of bypassing the flow-control branch. The bypass mechanism may include but not limited to: an unrestricted flow in both direction, and an unrestricted flow in one direction and a complete block in another direction.

As shown in FIG. 2, the device 130 may also include a cross-control mechanism. The first hydraulic circuit 210 may include a control port 216, and a hydraulic line 124a may connect the control port 216 to the JB port 124. Similarly, the second hydraulic circuit 250 may include a control port 256, and a hydraulic line 122a may connect the control port 256 to the JA port 122. Therefore, the JA port 122 is configured to control, via the control port 256, a flow condition between the JB port 124 and the VB port 144; and the JB port 124 is configured to control, via the control port 216, a flow condition between the JA port 122 and the VA port 142.

Figure 3A:
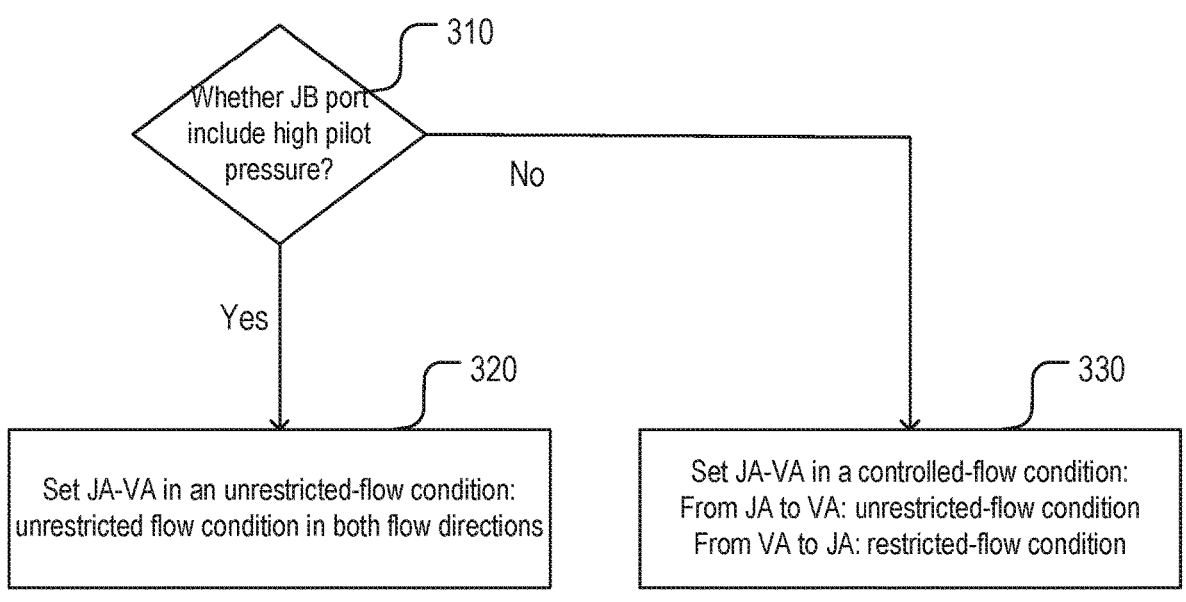
FIGS. 3A and 3B are flow diagrams of a method for adjusting rate of spool centering in a pilot-controlled hydraulic spool valve.
Figure 3B:
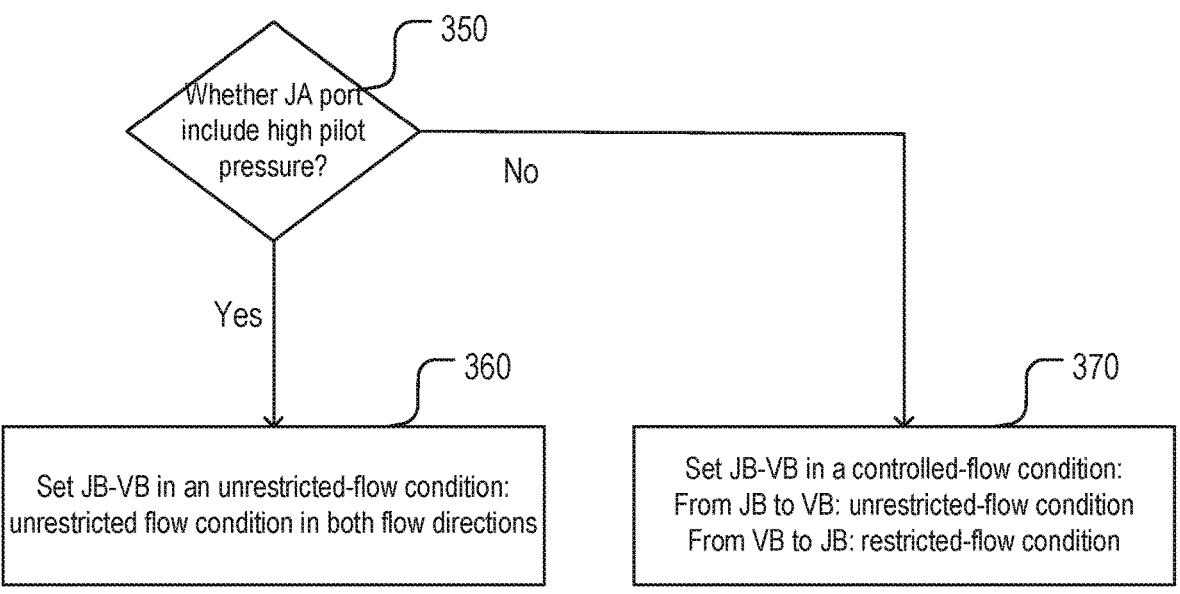

FIGS. 3A and 3B show embodiments of the cross-control mechanism. FIG. 3A shows an embodiment of the JB port controlling a flow condition between the JA and VA ports, and FIG. 3B shows an embodiment of the JA port controlling a flow condition between the JB and VB ports.

In FIG. 3A, the flow condition between the JA and VA ports may depend on whether the JB port includes a high pilot pressure 310. When the JB port includes the high pilot pressure, the flow condition between the JA and VA ports may be configured in an unrestricted-flow condition 320, wherein both flow directions between JA and VA ports are unrestricted. When the JB port does not include the high pilot pressure, the flow condition between the JA and VA ports may be configured in a controlled-flow condition 330, wherein an unrestricted-flow condition from JA to VA ports and a restricted-flow condition from VA to JA ports. In one implementation, when the JB port does not include the high pilot pressure, the JB port may include a low pilot pressure or almost zero pilot fluid pressure.

Similarly, in FIG. 3B, the flow condition between the JB and VB ports may depend on whether the JA port includes a high pilot pressure 350. When the JA port includes the high pilot pressure, the flow condition between the JB and VB ports may be configured in an unrestricted-flow condition 360, wherein both flow directions between JB and VB ports are unrestricted. When the JA port does not include the high pilot pressure, the flow condition between the JB and VB ports may be configured in a controlled-flow condition 370, wherein an unrestricted-flow condition from JB to VB ports and a restricted-flow condition from VB to JB ports. In one implementation, when the JA port does not include the high pilot pressure, the JA port may include a low pilot pressure or almost zero pilot fluid pressure.

Figure 4:
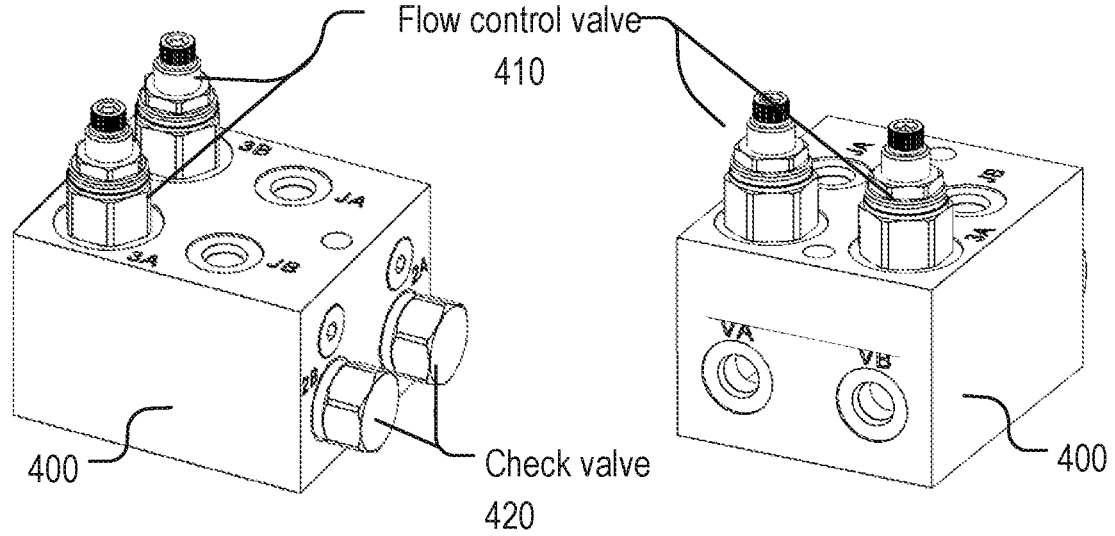
FIG. 4 is a schematic diagram of a device for adjusting rate of spool centering in a pilot-controlled hydraulic spool valve.

In one embodiment as shown in FIG. 4, the device 130 may further include a manifold 400 as an enclosure housing the above components. In one implementation, the controlled-flow branch may include a flow-control valve 410 (e.g., a needle valve) parallel with a check valve 420, wherein the check valve may block pilot hydraulic fluid from flowing along a direction of from main hydraulic valve section to pilot section. The flow control valve in the controlled-flow branch may be an adjustable flow control valve. By adjusting the adjustable flow control valve to control the flow rate of the hydraulic fluid, a controlled rate/speed of the spool moving from either left or right positions to center position can be achieved, thus controlling the rate/speed at which the hydraulic equipment stops.

Below, the present disclosure describes several embodiments for adjusting rate of spool centering in a pilot-controlled hydraulic spool valve.

Embodiment One

Figure 5:
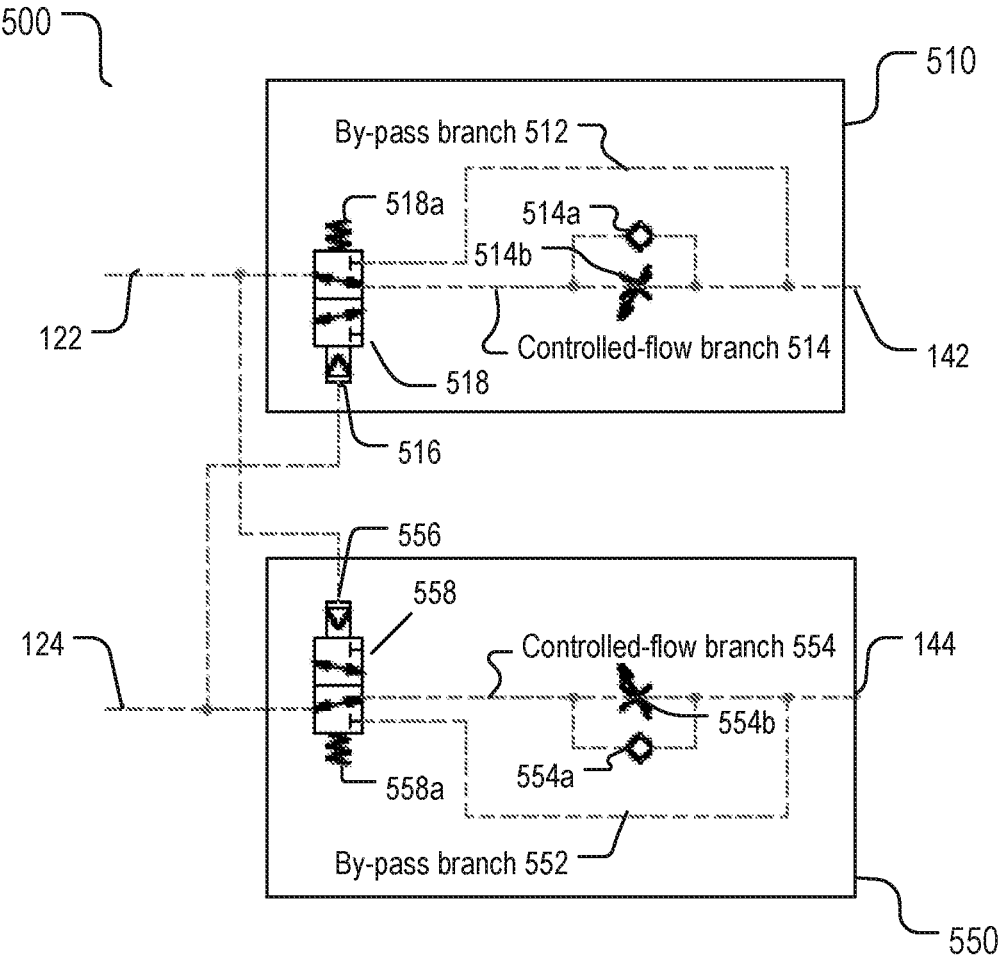
FIG. 5 is a schematic diagram of an embodiment for adjusting rate of spool centering in a pilot-controlled hydraulic spool valve.

FIG. 5 shows a schematic diagram of a device 500 for adjusting rate of spool centering in a pilot-controlled hydraulic spool valve. The device 500 may include a first hydraulic circuit 510 and a second hydraulic circuit 550.

As shown in FIG. 5, the first hydraulic circuit may include a by-pass branch 512 and a controlled-flow branch 514. The controlled-flow branch 514 may include a check valve 514a in parallel with a flow control valve 514b. The check valve 514a may block pilot hydraulic fluid from flowing along a direction of from the VA port 142 to the JA port 122, but allow pilot hydraulic fluid flowing unrestrictedly from the JA port 122 to the VA port 142. The flow control valve in the controlled-flow branch may be an adjustable flow control valve. In one implementation, the flow-control valve 514b may include a needle valve.

As shown in FIG. 5, the first hydraulic circuit 510 may also include a branch-selection valve 518, which is cross-controlled by the JB port 124 via a control port 516. Therefore, the JB port 124 may control the branch-selection valve 518 to select one of the controlled-flow branch 514 and the by-pass branch 512 for connecting JA and VA. The branch-selection valve 518 may be any type of hydraulic valve suitable for this purpose, for example as shown in FIG. 5, the branch-selection valve 518 may include a 3-way, 2-position valve.

When the JB port 124 includes a high pilot pressure, the branch-selection valve 518 may move upwards so that the by-pass branch 512 is selected, and thus, the hydraulic fluid may flow in an unrestricted condition in both directions.

On the other hand, when the JB port 124 does not include the high pilot pressure, the branch-selection valve 518 may move downwards due the force of the spring 518a so that the controlled-flow branch 514 is selected, and thus, the hydraulic fluid may flow in a controlled-flow condition: an unrestricted-flow condition via the check valve 514a for flow direction from JA 122 to VA 142; and a restricted-flow condition via the flow control valve 514b for flow direction from VA 142 to JA 122.

Similarly, as shown in FIG. 5, the second hydraulic circuit 550 may include a controlled-flow branch 554, a by-pass branch 552, and a branch-selection valve 558. The controlled-flow branch 554 may include a check valve 554a in parallel with a flow control valve 554b.

The branch-selection valve 558 may be cross-controlled by the JA port 122 via a control port 556. Therefore, the JA port 122 may control the branch-selection valve 558 to select one of the controlled-flow branch 554 and the by-pass branch 552 for connecting JB and VB. The branch-selection valve 558 may be any type of hydraulic valve suitable for this purpose, for example as shown in FIG. 5, the branch-selection valve 558 may include a 3-way, 2-position valve.

When the JA port 122 includes a high pilot pressure, the branch-selection valve 558 may move downwards so that the by-pass branch 552 is selected, and thus, the hydraulic fluid may flow in an unrestricted condition in both directions.

On the other hand, when the JA port 122 does not include the high pilot pressure, the branch-selection valve 558 may move upwards due the force of the spring 558a so that the controlled-flow branch 554 is selected, and thus, the hydraulic fluid may flow in a controlled-flow condition: an unrestricted-flow condition via the check valve 554a for flow direction from JB 124 to VB 144; and a restricted-flow condition via the flow control valve 554b for flow direction from VB 144 to JB 124.

Embodiment Two

Figure 6:
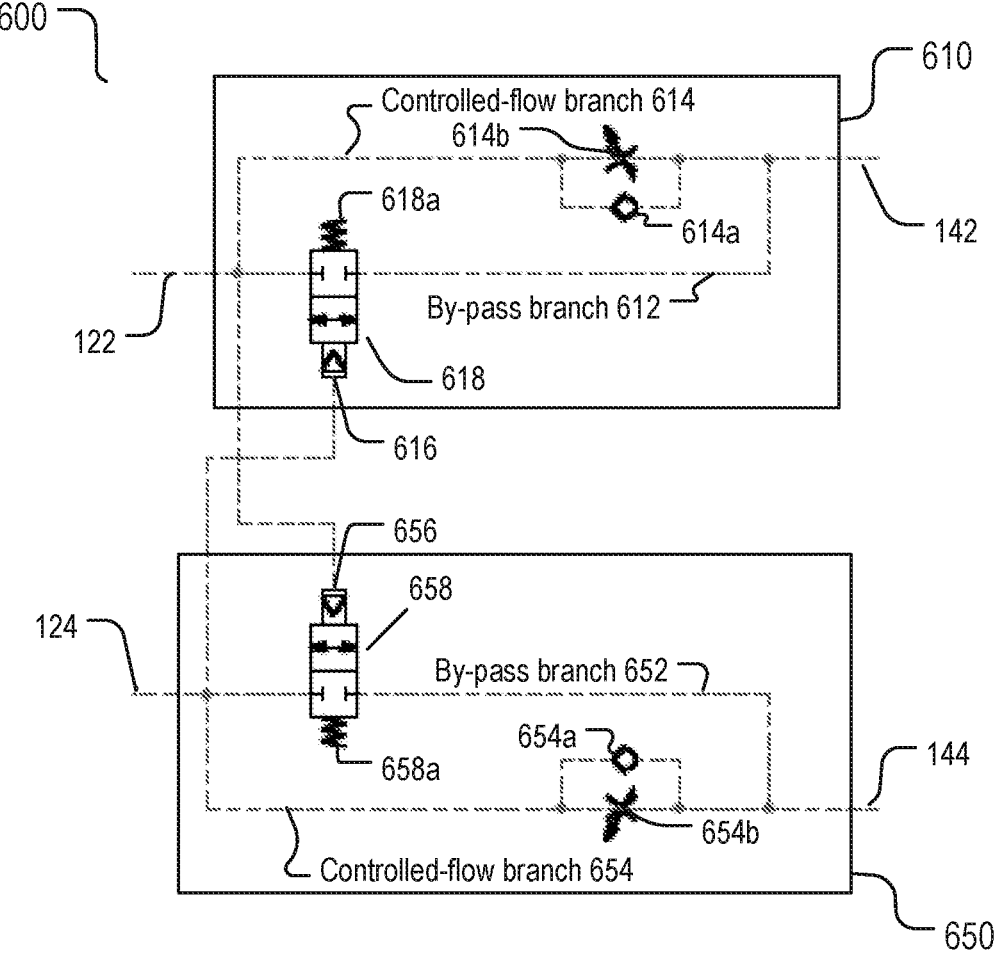
FIG. 6 is a schematic diagram of another embodiment for adjusting rate of spool centering in a pilot-controlled hydraulic spool valve.

FIG. 6 shows a schematic diagram of another embodiment of a device 600 for adjusting rate of spool centering in a pilot-controlled hydraulic spool valve. The device 600 may include a first hydraulic circuit 610 and a second hydraulic circuit 650.

As shown in FIG. 6, the first hydraulic circuit 610 may include a by-pass branch 612 and a controlled-flow branch 614. The controlled-flow branch 614 may include a check valve 614a in parallel with a flow control valve 614b. The check valve 614a may block pilot hydraulic fluid from flowing along a direction of from the VA port 142 to the JA port 122, but allow pilot hydraulic fluid flowing unrestrictedly from the JA port 122 to the VA port 142. The flow control valve in the controlled-flow branch may be an adjustable flow control valve. In one implementation, the flow-control valve 614b may include a needle valve. As shown in FIG. 6, The controlled-flow branch 614 may connect JA port 122 and VA port 142 directly.

As shown in FIG. 6, the first hydraulic circuit 610 may also include a bypass-branch-selection valve 618, which is cross-controlled by the JB port 124 via a control port 616. Therefore, the JB port 124 may control the bypass-branch-selection valve 618 to select the by-pass branch 612 for connecting JA and VA. The bypass-branch-selection valve 618 may be any type of hydraulic valve suitable for this purpose, for example as shown in FIG. 6, the bypass-branch-selection valve 618 may include a 2-way, 2-position valve.

When the JB port 124 includes a high pilot pressure, the bypass-branch-selection valve 618 may move upwards so that the by-pass branch 612 is selected, and thus, the hydraulic fluid may flow in an unrestricted condition in both directions.

On the other hand, when the JB port 124 does not include the high pilot pressure, the bypass-branch-selection valve 618 may move downwards due the force of the spring 618a so that the bypass branch 612 is blocked or un-selected, and thus, the hydraulic fluid may flow in a controlled-flow condition: an unrestricted-flow condition via the check valve 614a for flow direction from JA 122 to VA 142; and a restricted-flow condition via the flow control valve 614b for flow direction from VA 142 to JA 122.

Similarly, as shown in FIG. 6, the second hydraulic circuit 650 may include a controlled-flow branch 654, a by-pass branch 652, and a bypass-branch-selection valve 658. The controlled-flow branch 654 may include a check valve 654a in parallel with a flow control valve 654b.

The bypass-branch-selection valve 658 may be cross-controlled by the JA port 122 via a control port 656.

Therefore, the JA port 122 may control the bypass-branch-selection valve 658 to select the by-pass branch 652 for connecting JB 124 and VB 144. The bypass-branch-selection valve 658 may be any type of hydraulic valve suitable for this purpose, for example as shown in FIG. 6, the bypass-branch-selection valve 658 may include a 2-way, 2-position valve.

When the JA port 122 includes a high pilot pressure, the bypass-branch-selection valve 658 may move downwards so that the by-pass branch 652 is selected, and thus, the hydraulic fluid may flow in an unrestricted condition in both directions.

On the other hand, when the JA port 122 does not include the high pilot pressure, the bypass-branch-selection valve 658 may move upwards due the force of the spring 658a so that the by-pass branch 652 is un-selected or blocked, and thus, the hydraulic fluid may flow in a controlled-flow condition: an unrestricted-flow condition via the check valve 654a for flow direction from JB 124 to VB 144; and a restricted-flow condition via the flow control valve 654b for flow direction from VB 144 to JB 124.

Embodiment Three

Figure 7:
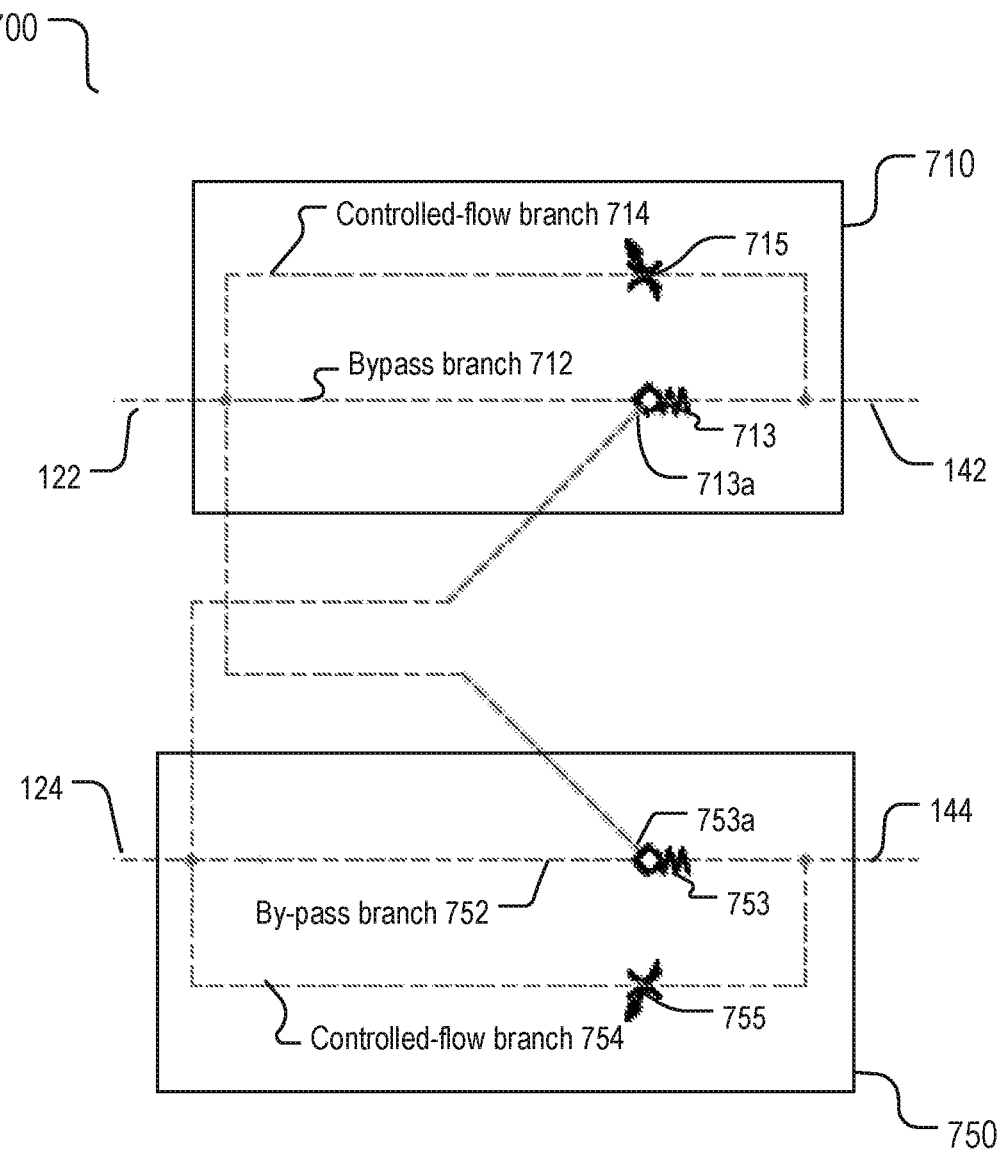
FIG. 7 is a schematic diagram of another embodiment for adjusting rate of spool centering in a pilot-controlled hydraulic spool valve.

FIG. 7 shows a schematic diagram of another embodiment of a device 700 for adjusting rate of spool centering in a pilot-controlled hydraulic spool valve. The device 700 may include a first hydraulic circuit 710 and a second hydraulic circuit 750.

As shown in FIG. 7, the first hydraulic circuit 710 may include a by-pass branch 712 and a controlled-flow branch 714. The controlled-flow branch 714 may include a flow control valve 715. The bypass branch 712 may include a pilot-controlled check valve 713.

As shown in FIG. 7, the flow control valve 715 in the controlled-flow branch may be an adjustable flow control valve, restricting the flow rate of the hydraulic fluid in both directions. In one implementation, the flow-control valve 715 may include an adjustable needle valve.

As shown in FIG. 7, the pilot-controlled check valve 713 may have a pilot port 713a connecting to the JB port 124. When the JB port 124 includes a high pilot pressure, the pilot-controlled check valve 713 may be in an open state, so that the hydraulic fluid may flow in an unrestricted condition in both directions. On the other hand, when the JB port 124 does not include the high pilot pressure, the pilot-controlled check valve 713 may be in a normal state, and thus, the hydraulic fluid may flow in a controlled-flow condition: an unrestricted-flow condition via the pilot-controlled check valve 713 for flow direction from JA 122 to VA 142; and a blockage of hydraulic fluid flow via the pilot-controlled check valve 713 for flow direction from VA 142 to JA 122. In one implementation, the pilot-controlled check valve 713 may include a spring so that, even for the normally open flow direction, the fluid may need to overcome the spring force to open the pilot-controlled check valve, so that a small pressure drop may exist between the JA port 122 and the VA port 142.

Considering the bypass branch and the controlled-flow branch together under the condition that the JB port 124 does not include the high pilot pressure, the hydraulic fluid may flow in a controlled-flow condition: an unrestricted-flow condition via the bypass branch for flow direction from JA 122 to VA 142; and a restricted-flow condition via the controlled-flow branch for flow direction from VA 142 to JA 122.

Similarly as shown in FIG. 7, the second hydraulic circuit 750 may include a by-pass branch 752 and a controlled-flow branch 754. The controlled-flow branch 754 may include a flow control valve 755. The bypass branch 752 may include a pilot-controlled check valve 753.

As shown in FIG. 7, the flow control valve 755 in the controlled-flow branch may be an adjustable flow control valve, restricting the flow rate of the hydraulic fluid in both directions. In one implementation, the flow-control valve 755 may include an adjustable needle valve.

As shown in FIG. 7, the pilot-controlled check valve 753 may have a pilot port connecting to the JA port 122. When the JA port 122 includes a high pilot pressure, the pilot-controlled check valve 753 may be in an open state, so that the hydraulic fluid may flow in an unrestricted condition in both directions. On the other hand, when the JA port 122 does not include the high pilot pressure, the pilot-controlled check valve 753 may be in a normal state, and thus, the hydraulic fluid may flow in a controlled-flow condition: an unrestricted-flow condition via the pilot-controlled check valve 753 for flow direction from JB 124 to VB 144; and a blockage of hydraulic fluid flow via the pilot-controlled check valve 753 for flow direction from VB 144 to JB 124. In one implementation, the pilot-controlled check valve 753 may include a spring so that, even for the normally open flow direction, the fluid may need to overcome the spring force to open the pilot-controlled check valve, so that a small pressure drop of hydraulic fluid may exist between the JB port 124 and the VB port 144.

Considering the bypass branch and the controlled-flow branch together under the condition that the JA port 122 does not include the high pilot pressure, the hydraulic fluid may flow in a controlled-flow condition: when hydraulic fluid flows in a direction from JB 124 to VB 144, hydraulic fluid flows in an unrestricted-flow condition via the bypass branch; and when hydraulic fluid flows in a direction from VB 144 to JB 124, hydraulic fluid flows in a restricted-flow condition via the controlled-flow branch.

The present disclosure is not limited to the above exemplary embodiments, and may include a combination of a portion of the above exemplary embodiments. For example, one embodiment may include a first hydraulic circuit 510 in FIG. 5 and a second hydraulic circuit 650 in FIG. 6; or another embodiment may include a first hydraulic circuit 610 in FIG. 6 and a second hydraulic circuit 750 in FIG. 7.

Figure 8:
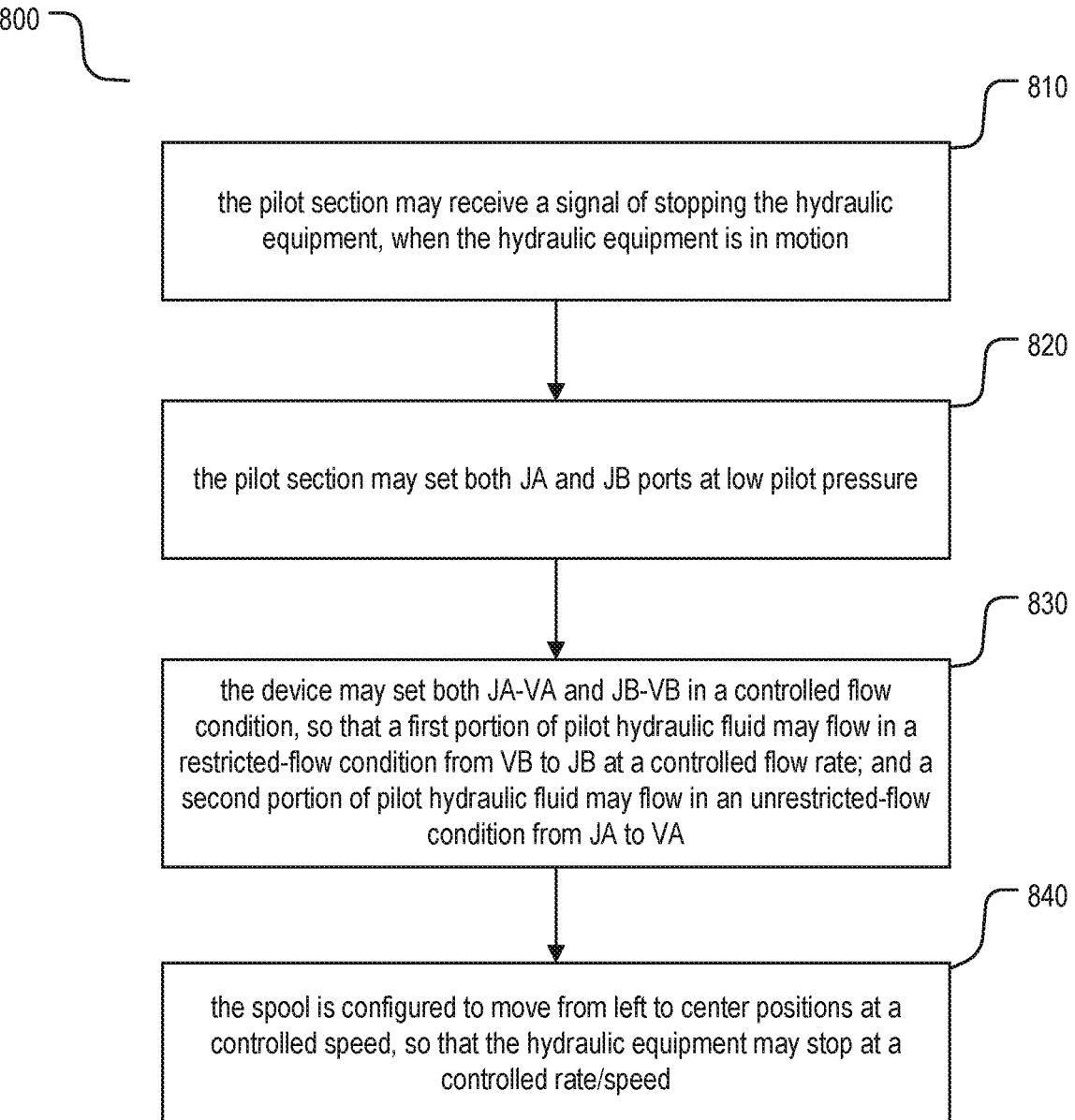
FIG. 8 is a flow diagram of a process of using the apparatus or system in the present disclosure.

FIG. 8 shows flow diagram of a method for using the above embodiment wherein an abrupt signal to stop a hydraulic equipment is received when the hydraulic equipment is in motion. The method 800 may include the following steps. The components and devices described in above disclosure may be used as exemplary descriptions.

In step 810: the pilot section may receive a signal of stopping the hydraulic equipment, when the hydraulic equipment is in motion. When the hydraulic equipment is in motion, the spool may not be at the center position, for example, the spool may be at the left position.

In step 820: the pilot section may set both JA and JB ports at low pilot pressure.

In step 830: the device may set both JA-VA and JB-VB in a controlled flow condition, so that a first portion of pilot hydraulic fluid may flow in a restricted-flow condition from VB to JB at a controlled flow rate; and a second portion of pilot hydraulic fluid may flow in an unrestricted-flow condition from JA to VA.

In step 840: the spool is configured to move from left to center positions at a controlled speed, so that the hydraulic equipment may stop at a controlled rate/speed.

FIG. 9 shows flow diagram of a method for using the above embodiment wherein an abrupt signal to start a hydraulic equipment is received when the hydraulic equipment is stationary. The method 900 may include the following steps. The components and devices described in above disclosure may be used as exemplary descriptions.

In step 910: the pilot section may receive a signal of moving the hydraulic equipment, when the hydraulic equipment is stationary. When the hydraulic equipment is stationary, the spool may be at the center position.

In step 920: the pilot section may set the JA port at high pilot pressure and the JB port at low pilot pressure.

In step 930: the device may set JA-VA in a controlled flow condition and set JB-VB in an unrestricted flow condition, so that a first portion of pilot hydraulic fluid may flow in a unrestricted-flow condition from JA to VA; and a second portion of pilot hydraulic fluid may flow in an unrestricted-flow condition from VB to JB.

In step 940: the spool is configured to move unrestrictedly from center positions to the left position, so that the hydraulic equipment may move at a rate/speed that is not restricted by the device.

Here in this disclosure, the terms of "unrestrict", "unrestricted", and "unrestrictedly" refer to not being purposely restricted by the device 130 in FIG. 1. Many other unintentional factors may restrict or reduce the rate/speed of hydraulic fluid flowing through a hydraulic circuit, including but not limited to, smaller fluid pressure difference and smaller cross-section of fluid conduit.

While the present disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. An apparatus for adjusting rate of spool centering in a pilot-controlled hydraulic spool valve, the apparatus comprising:
   a first pilot port adapted to connect to a first pilot fluid port of a pilot section;
   a second pilot port adapted to connect to a second pilot fluid port of the pilot section;
   a first valve port adapted to connect to a first control port of a hydraulic spool valve;
   a second valve port adapted to connect to a second control port of the hydraulic spool valve;
   a first hydraulic circuit connecting the first pilot port and the first valve port, wherein the first hydraulic circuit comprises a first bypass branch, a first controlled-flow branch, and a first valve that is coupled to the second pilot port, wherein the first valve facilitates a controlled-flow condition between the first pilot port and the first valve port when a hydraulic fluid pressure of the second pilot port is associated with a first pressure; and wherein the first valve facilitates an unrestricted-flow condition between the first pilot port and the first valve port when the hydraulic fluid pressure of the second pilot port is associated with a second pressure that is higher than the first pressure; and
   a second hydraulic circuit connecting the second pilot port and the second valve port, wherein the second hydraulic circuit comprises a second bypass branch, a second controlled-flow branch, and a second valve that is coupled to the first pilot port, wherein the second valve facilitates a controlled-flow condition between the second pilot port and the second valve port when a hydraulic fluid pressure of the first pilot port is associated with a third pressure; and wherein the second valve facilitates an unrestricted-flow condition between the second pilot port and the second valve port when the hydraulic fluid pressure of the first pilot port is associated with a fourth pressure that is higher than the third pressure.

2. The apparatus according to claim 1, wherein:
   in response to a high pilot pressure of the second pilot port, the first hydraulic circuit is in the unrestricted-flow condition; and
   in response to a low pilot pressure of the second pilot port, the first hydraulic circuit is in the controlled-flow condition.

3. The apparatus according to claim 2, wherein:
   when the first hydraulic circuit is in the unrestricted-flow condition, pilot hydraulic fluid is configured to flow unrestrictedly in both directions between the first pilot port and the first valve port; and
   when the first hydraulic circuit is in the controlled-flow condition, the pilot hydraulic fluid is configured to flow unrestrictedly in a direction from the first pilot port to the first valve port, and flow restrictedly at a first flow rate in a direction from the first valve port to the first pilot port, wherein the first flow rate is adjustable.

4. The apparatus according to claim 1, wherein:
   in response to a high pilot pressure of the first pilot port, the second hydraulic circuit is in the unrestricted-flow condition; and
   in response to a low pilot pressure of the first pilot port, the second hydraulic circuit is in the controlled-flow condition.

5. The apparatus according to claim 4, wherein:
   when the second hydraulic circuit is in the unrestricted-flow condition, pilot hydraulic fluid is configured to flow unrestrictedly in both directions between the second pilot port and the second valve port; and
   when the second hydraulic circuit is in the controlled-flow condition, the pilot hydraulic fluid is configured to flow unrestrictedly in a direction from the second pilot port to the second valve port, and flow restrictedly at a second flow rate in a direction from the second valve port to the second pilot port, wherein the second flow rate is adjustable.

6. The apparatus according to claim 1,
   wherein the first bypass branch and the first controlled-flow branch are in parallel.

7. The apparatus according to claim 6, wherein:
   the first bypass branch comprises a section of hydraulic fluid conduit;
   the first controlled-flow branch of the first hydraulic circuit comprises a check valve and a flow control valve, the check valve and the flow control valve being parallel to each other.

8. The apparatus according to claim 7, wherein:
   in response to the second pressure of the second pilot port, the first valve of the first hydraulic circuit is configured to select the first bypass branch of the first hydraulic circuit, so that the first hydraulic circuit is in the unrestricted-flow condition; and in response to the first pressure of the second pilot port, the first valve of the first hydraulic circuit is configured to select the first controlled-flow branch of the first hydraulic circuit, so that the first hydraulic circuit is in the controlled-flow condition.

9. The apparatus according to claim 8, wherein:

the first valve of the first hydraulic circuit comprises a 3-way, 2-position hydraulic valve; and the flow control valve comprises an adjustable flow control valve.

10. The apparatus according to claim 8, wherein:

the second controlled-flow branch of the second hydraulic circuit comprises a check valve and a flow control valve, the check valve and the flow control valve being parallel to each other; and in response to the fourth pressure, the second valve is configured to select the second bypass branch of the second hydraulic circuit, so that the second hydraulic circuit is in the unrestricted-flow condition, and in response to the third pressure, the second valve is configured to select the second controlled-flow branch of the second hydraulic circuit, so that the second hydraulic circuit is in the controlled-flow condition.

11. The apparatus according to claim 1, wherein:

the first bypass branch and the first valve are in series, and then collectively are in parallel with the first controlled-flow branch;

the first bypass branch of the first hydraulic circuit comprises a section of hydraulic fluid conduit;

the first controlled-flow branch of the first hydraulic circuit comprises a check valve and a flow control valve, the check valve and the flow control valve being parallel to each other;

in response to the second pressure, the first valve is configured to select the first bypass branch of the first hydraulic circuit, so that the first hydraulic circuit is in the unrestricted-flow condition, and in response to the first pressure, the first valve is configured to block the first bypass branch of the first hydraulic circuit, so that the first hydraulic circuit is in the controlled-flow condition.

12. The apparatus according to claim 11, wherein:

the first valve comprises a 2-way, 2-position hydraulic valve; and the flow control valve comprises an adjustable flow control valve.

13. The apparatus according to claim 11, wherein:

the second controlled-flow branch of the second hydraulic circuit comprises a check valve and a flow control valve that are parallel to each other; and in response to the fourth pressure, the second valve is configured to select the second bypass branch of the second hydraulic circuit, so that the second hydraulic circuit is in the unrestricted-flow condition and in response to the third pressure, the second valve is configured to block the second bypass branch of the second hydraulic circuit, so that the second hydraulic circuit is in the controlled-flow condition.

14. The apparatus according to claim 1, wherein:

the first bypass branch of the first hydraulic circuit comprises the first valve, which comprises a first pilot-controlled check valve, a pilot port of the first pilot-controlled check valve configured to connect to the second pilot port;

the first controlled-flow branch of the first hydraulic circuit comprises a flow control valve; and wherein:

in response to the second pressure, the first pilot-controlled check valve is configured to be in an open state, so that the first hydraulic circuit is in the unrestricted-flow condition, and in response to the first pressure, the first pilot-controlled check valve is configured to be in a normal state, so that the first hydraulic circuit is in the controlled-flow condition.

15. The apparatus according to claim 14, wherein:

when the first pilot-controlled check valve of the first hydraulic circuit is in the open state, the first pilot-controlled check valve allows hydraulic fluid flowing unrestrictedly in both directions; and when the first pilot-controlled check valve of the first hydraulic circuit is in the normal state, the first pilot-controlled check valve blocks the hydraulic fluid flowing in a direction from the first valve port to the first pilot port, and allows the hydraulic fluid flowing unrestrictedly in a direction from the first pilot port to the first valve port.

16. The apparatus according to claim 15, wherein:

the first pilot-controlled check valve comprises a spring-loaded pilot-controlled check valve; and the flow control valve comprises an adjustable flow control valve.

17. The apparatus according to claim 15, wherein:

the second bypass branch of the second hydraulic circuit comprises the second valve, which comprises a second pilot-controlled check valve, a pilot port of the second pilot-controlled check valve configured to connect to the first pilot port;

the second controlled-flow branch of the second hydraulic circuit comprises a flow control valve; and wherein:

in response to the fourth pressure, the second pilot-controlled check valve is configured to be in an open state, so that the second hydraulic circuit is in the unrestricted-flow condition, and in response to the third pressure, the second pilot-controlled check valve is configured to be in a normal state, so that the second hydraulic circuit is in the controlled-flow condition.

18. A device for adjusting rate of spool centering in a pilot-controlled hydraulic spool valve, the device comprising:

a manifold comprising:

a first pilot port adapted to connect to a first pilot fluid port of a pilot section, a second pilot port adapted to connect to a second pilot fluid port of the pilot section, a first valve port adapted to connect to a first control port of a hydraulic spool valve, and a second valve port adapted to connect to a second control port of the hydraulic spool valve;

a first hydraulic circuit disposed inside the manifold, the first hydraulic circuit connecting the first pilot port and the first valve port, wherein the first hydraulic circuit comprises a first bypass branch, a first controlled-flow branch, and a first valve that is coupled to the second pilot port, wherein the first valve permits flow in the first bypass branch when the second pilot port is associated with a first hydraulic fluid pressure; and wherein the first valve blocks flow in the first bypass branch when the second pilot port is associated with a second hydraulic fluid pressure that is lower than the first hydraulic fluid pressure; and a second hydraulic circuit disposed inside the manifold, the second hydraulic circuit connecting the second pilot port and the second valve port, wherein the second hydraulic circuit comprises a second bypass branch, a second controlled-flow branch, and a second valve that is coupled to the first pilot port, wherein the second valve permits flow in the second bypass branch when the first pilot port is associated with a third hydraulic fluid pressure;

and wherein the second valve blocks flow in the second bypass branch when the first pilot port is associated with a fourth hydraulic fluid pressure that is lower than the third hydraulic fluid pressure.

19. A system for adjusting rate of spool centering in a pilot-controlled hydraulic spool valve, the system comprising:

a pilot valve configured to receive control signal from an operator;

a flow control device configured to receive hydraulic fluid from the pilot valve;

a main hydraulic valve configured to receive hydraulic fluid from the flow control device; and wherein the flow control device comprises:

a first pilot port adapted to connect to a first pilot fluid port of the pilot valve, a second pilot port adapted to connect to a second pilot fluid port of the pilot valve, a first valve port adapted to connect to a first control port of the main hydraulic valve, a second valve port adapted to connect to a second control port of the main hydraulic valve, a first hydraulic circuit connecting the first pilot port and the first valve port, wherein the first hydraulic circuit comprises a first bypass branch, a first controlled-flow branch, and a first valve that is in series with the first bypass branch and that is coupled to the second pilot port; and a second hydraulic circuit connecting the second pilot port and the second valve port, wherein the second hydraulic circuit comprises a second bypass branch, a second controlled-flow branch, and a second valve that is in series with the second bypass branch and that is coupled to the first pilot port.

20. The system according to claim 19, wherein:

when the second pilot port comprises a first hydraulic fluid pressure, then the first valve opens the first bypass branch in both directions between the first pilot port and the first valve port;

when the second pilot port comprises a second hydraulic fluid pressure that is lower than the first hydraulic fluid pressure, then the first valve closes the first bypass branch between the first valve port and the first pilot port;

when the first pilot port comprises a third hydraulic fluid pressure, then the second valve opens the second bypass branch in both directions between the second pilot port and the second valve port; and when the first pilot port comprises a fourth hydraulic fluid pressure that is lower than the third hydraulic fluid pressure, then the second valve closes the second bypass branch between the second valve port and the second pilot port.

* * * * *